US010572803B2

(12) United States Patent
Mital et al.

(10) Patent No.: US 10,572,803 B2
(45) Date of Patent: *Feb. 25, 2020

(54) ADDITION OF PLAN-GENERATION MODELS AND EXPERTISE BY CROWD CONTRIBUTORS

(71) Applicant: Microsoft Technology Licensing, LLC, Redmond, WA (US)

(72) Inventors: Vijay Mital, Kirkland, WA (US); Darryl E. Rubin, Duvall, WA (US); Oscar E. Murillo, Redmond, WA (US); Colleen G. Estrada, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

This patent is subject to a terminal disclaimer.

(21) Appl. No.: 14/929,242

(22) Filed: Oct. 30, 2015

(65) Prior Publication Data

US 2016/0189031 A1     Jun. 30, 2016

Related U.S. Application Data

(63) Continuation of application No. 12/965,845, filed on Dec. 11, 2010, now Pat. No. 9,208,472.

(51) Int. Cl.
*G06N 5/02* (2006.01)
*G06Q 10/10* (2012.01)

(52) U.S. Cl.
CPC ............... *G06N 5/022* (2013.01); *G06N 5/02* (2013.01); *G06Q 10/101* (2013.01)

(58) Field of Classification Search
CPC ......... G06N 5/02; G06N 5/022; G06Q 10/101
See application file for complete search history.

(56) References Cited

U.S. PATENT DOCUMENTS

| 5,634,125 | A | 5/1997 | Li |
| 5,948,040 | A | 9/1999 | Delorme et al. |
| 6,054,991 | A | 4/2000 | Crane et al. |
| 6,412,080 | B1 | 6/2002 | Fleming et al. |

(Continued)

FOREIGN PATENT DOCUMENTS

WO     2007029207 A2     3/2007

OTHER PUBLICATIONS

Clements, et al., "Decentralized Deduplication in SAN Cluster File Systems", In Proceedings of Conference on USENIX Annual Technical Conference, Jun. 14, 2009, 23 Pages.

(Continued)

*Primary Examiner* — Vincent Gonzales

(57) ABSTRACT

The subject disclosure is directed towards a web service that maintains a set of models used to generate plans, such as vacation plans, in which the set of models includes models that are authored by crowd contributors via the service. The models include rules, constraints and/or equations, and may be text based and declarative such that any author can edit an existing model or combination of existing models into a new model. Users can access the models to generate a plan according to user parameters, view a presentation of that plan, and interact to provide new parameters to the model and/or with objects in the plan to modify the plan and view a presentation of the modified plan.

20 Claims, 5 Drawing Sheets

(56) References Cited

U.S. PATENT DOCUMENTS

| | | |
|---|---|---|
| 6,418,515 B1 | 7/2002 | Kurosawa |
| 6,687,815 B1 | 2/2004 | Dwyer, et al. |
| 6,970,639 B1 | 11/2005 | McGrath et al. |
| 6,976,229 B1 | 12/2005 | Balabanovic et al. |
| 7,076,602 B2 | 7/2006 | Stark et al. |
| 7,096,213 B2 | 8/2006 | Chatterjee et al. |
| 7,725,830 B2 | 5/2010 | Vronay |
| 8,090,200 B2 | 1/2012 | Barletta et al. |
| 2002/0152244 A1 | 10/2002 | Dean et al. |
| 2004/0034869 A1 | 2/2004 | Wallace et al. |
| 2004/0037540 A1 | 2/2004 | Frohlich et al. |
| 2004/0111443 A1 | 6/2004 | Wong et al. |
| 2004/0139481 A1 | 7/2004 | Atlas et al. |
| 2004/0168118 A1 | 8/2004 | Wong et al. |
| 2004/0264810 A1 | 12/2004 | Taugher et al. |
| 2005/0008343 A1 | 1/2005 | Frohlich et al. |
| 2005/0086204 A1 | 4/2005 | Coiera et al. |
| 2005/0281541 A1 | 12/2005 | Logan et al. |
| 2006/0277180 A1 | 12/2006 | Okamoto |
| 2007/0005874 A1 | 1/2007 | Dodge |
| 2007/0074115 A1 | 3/2007 | Patten et al. |
| 2007/0094277 A1 | 4/2007 | Fachan et al. |
| 2007/0106786 A1 | 5/2007 | Gleichauf |
| 2007/0106876 A1 | 5/2007 | Goswami |
| 2007/0112626 A1 | 5/2007 | Daly |
| 2007/0174042 A1 | 7/2007 | Thompson |
| 2008/0007567 A1 | 1/2008 | Clatworthy et al. |
| 2008/0010238 A1 | 1/2008 | Whyte et al. |
| 2008/0201227 A1 | 8/2008 | Bakewell et al. |
| 2008/0243564 A1 | 10/2008 | Busch et al. |
| 2008/0304808 A1 | 12/2008 | Newell et al. |
| 2008/0306925 A1 | 12/2008 | Campbell et al. |
| 2009/0013129 A1 | 1/2009 | Bondurant |
| 2009/0019345 A1 | 1/2009 | Kaufman et al. |
| 2009/0031246 A1 | 1/2009 | Cowtan et al. |
| 2009/0049077 A1 | 2/2009 | Lawlor |
| 2009/0089483 A1 | 4/2009 | Tanaka et al. |
| 2009/0171888 A1 | 7/2009 | Anglin |
| 2009/0210640 A1 | 8/2009 | Davis |
| 2009/0222352 A1 | 9/2009 | Shaer |
| 2009/0238538 A1 | 9/2009 | Fink |
| 2009/0271454 A1 | 10/2009 | Anglin et al. |
| 2009/0300321 A1 | 12/2009 | Balachandran et al. |
| 2009/0313055 A1 | 12/2009 | Martin et al. |
| 2009/0319547 A1 | 12/2009 | Hollis |
| 2010/0005380 A1 | 1/2010 | Lanahan et al. |
| 2010/0005417 A1 | 1/2010 | Lanahan et al. |
| 2010/0042790 A1 | 2/2010 | Mondal et al. |
| 2010/0058013 A1 | 3/2010 | Gelson et al. |
| 2010/0077013 A1 | 3/2010 | Clements et al. |
| 2010/0088296 A1 | 4/2010 | Periyagaram et al. |
| 2010/0094817 A1 | 4/2010 | Ben-Shaul et al. |
| 2010/0223128 A1 | 9/2010 | Dukellis et al. |
| 2010/0241629 A1 | 9/2010 | Tatemura et al. |
| 2010/0250896 A1 | 9/2010 | Matze |
| 2010/0299311 A1 | 11/2010 | Anglin et al. |
| 2011/0071862 A1* | 3/2011 | Cator .............. G06Q 10/02 705/5 |
| 2012/0150784 A1 | 6/2012 | Mital et al. |
| 2012/0150787 A1 | 6/2012 | Mital et al. |
| 2012/0151348 A1 | 6/2012 | Mital et al. |
| 2012/0151350 A1 | 6/2012 | Mital et al. |
| 2016/0125559 A1* | 5/2016 | Shekou .............. G06Q 50/14 705/6 |

OTHER PUBLICATIONS

Debnath, Biplob, "ChunkStash: Speeding up Inline Storage Deduplication using Flash Memory", In Proceedings of the Conference on USENIX Annual Technical Conference, Jun. 23, 2010, 16 Pages.

Debnath, et al., "FlashStore: High Throughput Persistent Key-Value Store", In Proceedings of the VLDB Endowment, vol. 3, Issue 1-2, Aug. 7, 2009, 1 Page.

Decandia, et al., "Dynamo: Amazon's Highly Available Key-Value Store", In Proceedings of the Twenty-First ACM Symposium on Operating Systems Principles, Oct. 14, 2007, pp. 205-220.

Dubnicki, "HYDRAstor: A Scalable Secondary Storage", In Proceedings of the 7th USENIX Conference on File and Storage Technologies, Feb. 24, 2009, 14 Pages.

Eshghi, et al., "A Framework for Analyzing and Improving Content-Based Chunking Algorithms", Hewlett-Packard Labs Technical Report TR 30, Feb. 25, 2005, 11 Pages.

Fegreus, "Lab Review: Data deduplication for real tape", Retrieved from <<http://www.infostor.com/index/articles/display/7052624306/articles/infostor/backup-and_recovery/archiving/2010/january-2010/lab-review_data_deduplication.html>>, Jan. 22, 2010, 6 Pages.

Gal, et al., "Algorithms and Data Structures for Flash Memories", In Journal ACM Computing Surveys (CSUR), vol. 37, No. 2, Jun. 1, 2005, pp. 1-30.

Gill, et al., "STOW: A Spatially and Temporally Optimized Write Caching Algorithm", In Proceedings of the 2009 Conference on USENIX Annual Technical Conference, Jun. 14, 2009, 14 Pages.

Gupta, et al., "DFTL: A Flash Translation Layer Employing Demand-Based Selective Caching of Page-Level Address Mappings", In Proceedings of the 14th International Conference on Architectural Support for Programming Languages and Operating Systems, Mar. 7, 2009, 12 Pages.

Hamilton, James, "Perspectives Blog: Inter-Datacenter Replication & Geo-Redundancy", Retrieved from <<http://perspectives.mvdirona.com/2010/05/inter-datacenter-replication-geo-redundancy/>>, May 10, 2010, 5 Pages.

Hyde, Kenneth F., "Information Processing and Touring Planning Theory", In Annals of Tourism Research, vol. 35, No. 3, Jul. 31, 2008, 20 Pages.

Kaly, "YoutubeDoubler: Compare Youtube Videos Side by Side", Retrieved from <<http://www.makeuseof.com/tag/youtubedoubler-compare-youtube/>>, Aug. 16, 2009, 4 Pages.

Kamar, et al., "Collaboration and Shared Plans in the Open World: Studies of Ridesharing", In Proceedings of the 21st International Joint Conference on Artifical Intelligence, Jul. 11, 2009, 8 Pages.

Kawaguchi, et al., "A Flash-Memory Based File System", In Proceedings of the USENIX 1995 Technical Conference, Jan. 16, 1995, 10 Pages.

Kgil, et al., "Improving NAND Flash Based Disk Caches", International Symposium on Computer Architecture, in Proceedings of the 35th Annual International Symposium on Computer Architecture, Jun. 21, 2008, pp. 327-338.

Kim, et al., "BPLRU: A Buffer Management Scheme for Improving Random Writes in Flash Storage", In Proceedings of the 6th USENIX Conference on File and Storage Technologies, Feb. 26, 2008, 14 Pages.

Koltsidas, et al., "Flashing up the Storage Layer", Proceedings of the VLDB Endowment, vol. 1, No. 1, Aug. 1, 2008, 12 Pages.

Kruus, et al., "Bimodal Content Defined Chunking for Backup Streams", In Proceedings of the 8th USENIX Conference on File and Storage Technologies, Feburary 23, 2010, 14 Pages.

Labelle, Chris, "Audio Slideshows—Human Interest Storytelling", Retrieved from <<http://blogs.oregonstate.edu/instructionaldesign/2010/07/20/audio-slideshows-human-interest-storytelling/>>, Jul. 20, 2010, 4 Pages.

Lee, et al. "A Log Buffer-Based Flash Translation Layer Using Fully-Associate Sector Translation", In Proceedings of the Transactions on Embedded Computing Systems, vol. 6, Issue 3, Jul. 1, 2007, 29 Pages.

Lillibridge, et al., "Sparse Indexing: Large Scale, Inline Deduplication Using Sampling and Locality", In Proceedings of the 7th USENIX Conference on File and Storage Technologies, Feb. 24, 2009, pp. 111-123.

Linden, et al., "Interactive Assessment of User Preference Models: The Automated Travel Assistant", In Proceedings of the Sixth International Conference on User Modeling, 1997, 36 Pages.

Liu, et al., "ADMAD: Application-Driven Metadata Aware De-duplication Archival Storage System", In Proceedings of Fifth IEEE International Workshop on Storage Network Architecture and Parallel I/Os., Sep. 22, 2008, 7 Pages.

(56) References Cited

OTHER PUBLICATIONS

LL, et al., "b-Bit Minwise Hashing", In Proceedings of the 19th International Conference on World Wide Web, Apr. 26, 2010, 10 Pages.

Malaka, et al., "DEEP MAP Challenging IT Research in the Framework of a Tourist Information System", In proceedings of Information and Communication Technologies in Tourism, 2000, 11 Pages.

Mearian, Lucas, "MySpace Replaces All Server Hard Disks with Flash Drives", Retrieved from <<http://www.computerworld.com/s/article/9139280/>>, Oct. 13, 2009, 4 Pages.

Meister, et al., "dedupv1: Improving Deduplication Throughput using Solid State Drives (SSD)", In Proceedings of the IEEE 26th Symposium on Mass Storage Systems and Technologies, May 3, 2010, 6 Pages.

Mercer, Shawn, "MySpace Uses Fusion Powered I/O to Drive Greener and Better Data Centers", In Fusion White Paper, 2009, 6 Pages.

Muthitacharoen, et al., "A Low-Bandwidth Network File System", In Proceedings of the ACM Symposium on Operating Systems Principles, Oct. 21, 2001, 14 Pages.

Myers, Daniel, "On the Use of NAND Flash Memory in High-Performance Relational Databases", In Dissertation submitted to Department of Electrical Engineering and Computer Science, Massachusetts Institute of Technology, Feb. 2008, 49 Pages.

Narayanan, et al., "Everest: Scaling Down Peak Loads through I/O Off-Loading", In Proceedings of the Conference on Operating Systems Design and Implementation, vol. 8, Dec. 8, 2008, 14 Pages.

Narayanan, et al., "Migrating Server Storage to SSDs: Analysis of Tradeoffs", In Proceedings of the 4th ACM European conference on Computer systems, Apr. 1, 2009, pp. 145-158.

Nath, et al., "Flash DB: Dynamic Self-tuning Database for NAND Flash", In Information Processing in Sensor Networks, Proceedings of the 6th International Conference on Information Processing in Sensor Networks, Apr. 25, 2007, 10 Pages.

Nath, et al., "Online Maintenance of Very Large Random Samples on Flash Storage", In Proceedings of the VLDB Endowment, vol. 1, No. 1, Aug. 1, 2008, pp. 1-14.

Nickerson, et al., "Matching Mechanisms to Situations Through the Wisdom of the Crowd", In proceedings of International Conference on Information System, Jan. 1, 2009, 16 Pages.

Norheim, Hans Olav., "How Flash Memory Changes the DBMS World an Introduction", Retrieved from <<http://www.hansolav.net/blog/content/binary/HowFlashMemory.pdf>>, Apr. 22, 2008, 12 Pages.

Olson, et al., "Berkeley DB", In Proceedings of the FREENIX Track: 1999 USENIX Annual Technical Conference, Jun. 6, 1999, 10 Pages.

Ousterhout, et al., "The Case for RAMClouds: Scalable High-Performance Storage Entirely in DRAM", In ACM SIGOPS Operating Systems, vol. 43, Issue: 4, Jan. 27, 2010, 14 Pages.

Pagh, et al., "Cuckoo Hashing", In Journal of Algorithms, vol. 51, No. 2, May 2004, pp. 1-27.

Pan, et al., "Online Information Search: Vacation Planning Process", In Annals of Tourism Research, vol. 33, Issue 3, Jul. 2006, 24 Pages.

Quinlan, et al., "Venti: A New Approach to Archival Storage", In Proceedings of the 1st USENIX Conference on File and Storage Technologies, Jan. 30, 2002, 13 Pages.

Rabin, Michael O., "Fingerprinting by Random Polynomials", Retrieved from <<http://www.xmailserver.org/rabin.pdf>>, 1981, 14 Pages.

Rosenblum, et al., "The Design and Implementation of a Log-Structured File System", In Journal ACM Transactions on Computer Systems (TOCS), vol. 10, Issue: 1, Feb. 1, 1992, 15 Pages.

Saab, Paul, "Releasing Flashcache", Retrieved from <<www.facebook.com/note.php?note_id=388112370932>>, Apr. 27, 2010, 1 Page.

Silberschatz, et al., "Operating System Concepts", Copyright 1994; Published 7th ed., Addison-Wesley, 1998, 90 Pages.

Sipvak, et al., "Storing a Persistent Transactional Object Heap on Flash Memory", In Proceedings of the ACM SIGPLAN/SIGBED Conference on Language, Compilers, and Tool Support for Embedded Systems, Jun. 14, 2006, 12 Pages.

Stoica, et al., "Chord: A Scalable Peer-to-Peer Lookup Service for Internet Applications", In Proceedings of the Conference on Applications, Technologies, Architectures, and Protocols for Computer Communications, vol. 31 Issue 4, Aug. 27, 2001, 12 Pages.

Ungureanu, et al., "HydraFS: A High-Throughput File System for the HYDRAstor Content-Addressable Storage System", In Proceedings of the 8th USENIX conference on File and Storage Technologies, Feb. 23, 2010, 14 Pages.

Venturini, et al., "Applying Trip@dvice Recommendation Technology to www.visiteurope.com", In Proceedings of the 17th European Conference on Artificial Intelligence, May 22, 2006, 5 Pages.

"Ancestral Quest 12.1", Retrieved from <<http://web.archive.org/web/20110130173432/http://genealogy-software-review.toptenreviews.com/ancestral-quest-software.html>>, Retrieved on Sep. 22, 2010, 6 Pages.

"Class PersistentStore", Retrieved from <<http://www.blackberry.com/developers/docs/4.5.0api/net/rim/device/api/system/PersistentStore.html>>, Retrieved on Dec. 8, 2009, 3 Pages.

"Comparing Deduplication Approaches: Technology Considerations for Enterprise Environments", Retrieved from <<http://web.archive.org/web/20100412024409/http://www.busmanagement.com/article/Comparing-Deduplication-Approaches-Technology-Considerations-for-Enterprise-Environments/>>, Oct. 20, 2010, 4 Pages.

"Data Deduplication in Tivoli Storage Manager V6.2 and V6.1", Retrieved from <<https://www.ibm.com/developerworks/community/wikis/home?lang=en#!/wiki/Tivoli+Storage+Manager/page/Data+deduplication+in+Tivoli+Storage+Manager+V6.2+and+V6.1>>, Retrieved on Oct. 20, 2010, 18 Pages.

"EMC Centera: Content-Addressed Storage System", Data Sheet, EMC2, 2003, 4 Pages.

"Fusion-IO: LLNL Redefines High Performance Computing with Fusion Powered 1/0", In Lawrence Livermore National Laboratory, 2009, 4 Pages.

"How Google Can Help Simplify Online Travel Planning", Retrieved from <<http://www.breakingtravelnews.com/focus/article/how-google-can-help-simplify-online-travel-planning/>>, Nov. 5, 2009, 11 Pages.

"Iometer", Retrieved from <<http://www.iometer.org/>>, Retrieved on Jun. 28, 2010, 1 Page.

"MurmurHash Function", Retrieved from <<http://web.archive.org/web/20100401203849/http://en.wikipedia.org/wiki/MurmurHash>>, Retrieved on Dec. 8, 2009, 2 Pages.

"Oracle Berkeley DB Products", Retrieved from <<http://web.archive.org/web/20100125180204/http://www.oracle.com/technology/products/berkeley-db/index.html>>, Retrieved on Dec. 8, 2009, 2 Pages.

"Rich Media and the Future of Travel Distribution", Retrieved from <<http://www.vfmii.com/media_content/sapient_rich_media_and_the_future_of travel.pdf>>, 2004, 4 Pages.

"Samsung SSD, Samsung Semiconductor—EOL Products", Samsung SSD, Part Number: MCCOE64G5MPP-0VA, Retrieved on Dec. 8, 2009, 1 Page.

"Secure Hash Standard", In Federal Information Processing Standards Publication 180-1, Apr. 17, 1995, 18 Pages.

"System. Threading Namespace", Retrieved from <<https://msdn.microsoft.com/en-us/library/system.threading(printer).aspx>>, Retrieved on Jun. 28, 2010, 5 Pages.

"TPC: Transaction Processing Benchmark", Retrieved from <<http://web.archive.org/web/20091209054245/http://www.tpc.org/default.asp>>, Retrieved on Dec. 8, 2009, 1 Page.

"Understanding the HP Data Deduplication Strategy", Retrieved from <<http://www.technologyreview.com/sites/default/files/legacy/4aa1-9796enw.pdf>>, Oct. 20, 2010, 28 Pages.

"Vacation Planning Is Made Easier Through GIS", Retrieved from <<http://www.esri.com/news/arcnews/summer07articles/vacation-planning.html>>, Retrieved on Sep. 13, 2010, 2 Pages.

(56) References Cited

OTHER PUBLICATIONS

"Xbox LIVE 1 vs 100 Game", Retrieved from <<http://web.archive.org/web/20091223125837/http://www.xbox.com/en-US/>>, Retrieved on Dec. 8, 2009, 1 Page.
"Xbox LIVE Primetime Game", Retrieved from <<http://web.archive.org/web/20100124195111/http://www.xboxprimetime.com/>>, Retrieved on Jun. 28, 2010, 4 Pages.
"Final Office Action Issued in U.S. Appl. No. 12/965,845", dated Apr. 8, 2014, 15 Pages.
"Non-final Office Action Issued in U.S. Appl. No. 12/965,845", dated Jan. 15, 2015, 17 Pages.
"Non-final Office Action Issued in U.S. Appl. No. 12/965,845", dated Jun. 5, 2013, 15 Pages.
"Notice of Allowance Issued in U.S. Appl. No. 12/965,845", dated Jul. 31, 2015, 9 Pages.
"Final Office Action Issued in U.S. Appl. No. 12/965,857", dated Jan. 15, 2013, 31 Pages.
"Final Office Action Issued in U.S. Appl. No. 12/965,857", dated Apr. 30, 2014, 33 Pages.
"Non-final Office Action Issued in U.S. Appl. No. 12/965,857", dated Oct. 29, 2013, 27 Pages.
"Non-final Office Action Issued in U.S. Appl. No. 12/965,857", dated Jul. 20, 2012, 25 Pages.
"Non-Final Office Action Issued in U.S. Appl. No. 12/965,857", dated Jan. 15, 2015, 36 Pages.
"Final Office Action Issued in U.S. Appl. No. 12/965,860", dated Oct. 24, 2013, 19 Pages.
"Non-final Office Action Issued in U.S. Appl. No. 12/965,860", dated Mar. 27, 2014, 23 Pages.
"Non-final Office Action Issued in U.S. Appl. No. 12/965,860", dated Mar. 13, 2013, 18 Pages.
"Final Office Action Issued in U.S. Appl. No. 12/965,861", dated Apr. 7, 2014, 35 Pages.
"Final Office Action Issued in U.S. Appl. No. 12/965,861", dated Jan. 15, 2013, 34 Pages.
"Non-final Office Action Issued in U.S. Appl. No. 12/965,861", dated Nov. 8, 2013, 30 Pages.
"Non-final Office Action Issued in U.S. Appl. No. 12/965,861", dated Jul. 27, 2012, 25 Pages.
Agarwal, et al., "Design Tradeoffs for SSD Performance", In proceeding of USENIX Annual Technical Conference, Jun. 22, 2008, 14 Pages.
Agrawal, et al., "Flash-Optimized Index Structures for Embedded Systems", Retrieved from <<ftp://128.119.240.170/pub/techrept/techreport/2008/UM-CS-2008-008.ps>>, 2008, 14 Pages.
Anand, et al., "Building Cheap and Large CAMs Using BufferHash", In University of Wisconsin Madison Technical Report TR1651, Feb. 2009, 15 Pages.
Anand, "Cheap and Large CAMs for High Performance Data-Intensive Networked Systems", In Proceedings of the Conference on Networked Systems Design and Implementation, Apr. 28, 2010, 16 Pages.
Andersen, et al., "FAWN: A Fast Array of Wimpy Nodes", Proceedings of the ACM SIGOPS 22nd symposium on Operating systems principles, Oct. 11, 2009, 17 Pages.
Askitis, Nikolas, "Fast and Compact Hash Tables for Integer Keys", In Proceedings of the Thirty-Second Australasian Conference on Computer Science—vol. 91, Jan. 1, 2009, 10 Pages.
Azar, et al., "Balanced Allocations", In SIAM Journal on Computing, vol. 29, Issue: 1, Sep. 1, 1999, pp. 180-200.
Benini, et al. "Palmtop Computers for Managing Interaction with Immersive Virtual Heritage", In Proceedings of EURO MEDIA 2002, Apr. 2202, 6 Pages.
Bentley, et al., "Personal vs. Commercial Content: The Similarities between Consumer Use of Photos and Music", In Proceedings of the Conference on Human Factors in Computing Systems, Apr. 22, 2006, pp. 667-676.
Bhagwat, et al., "Extreme Binning: Scalable, Parallel Deduplication for Chunk-based File Backup", In Proceedings of the 17th IEEE/ACM International Symposium on Modelling, Analysis and Simulation of Computer and Telecommunication Systems, Sep. 21, 2009, 9 Pages.
Brambilla, et al., "Process Modeling in Web Applications", In Journal ACM Transactions on Software Engineering and Methodology (TOSEM), vol. 15, Issue 4, Oct. 1, 2006, 50 Pages.
Broder, et al., "Network Applications of Bloom Filters: A Survey", Internet Mathematics, vol. 1, No. 4, 2003, 2003, pp. 485-509.
Caulfield, et al., "Gordon: Using Flash Memory to Build Fast, Power-Efficient Clusters for Data-Intensive Applications", In Proceeding of the 14th International Conference on Architectural Support for Programming Languages and Operating Systems, Mar. 7, 2009, 12 Pages.
Chen, Shimin, "Fiashlogging: Exploiting Flash Devices for Synchronous Logging Performance", In Proceedings of the 2009 ACM SIGMOD International Conference on Management of Data, Jun. 29, 2009, 14 Pages.
Chen, et al., "Understanding Intrinsic Characteristics and System Implications of Flash Memory Based Solid State Drives", In Proceedings of the Performance Evaluation Review, vol. 37, Issue 1, Jun. 15, 2009, 12 Pages.
Waclawek, Karl, "Berkeley DB for .NET", Retrieved from <<https://sourceforge.net/projects/libdb-dotnet/>>, Retrieved on Dec. 8, 2009, 1 Page.
Walfish, et al., "Distributed Quota Enforcement for Spam Control", In Proceedings of the 3rd Conference on Networked Systems Design & Implementation—vol. 3, May 8, 2006, pp. 281-296.
Wei, et al., "MAD2: A Scalable High-Throughput Exact Deduplication Approach for Network backup Services", In Proceedings of IEEE 26th Symposium on Mass Storage Systems and Technologies, May 3, 2010, 14 Pages.
Won Lee, et al., "A Case for Flash Memory SSD in Enterprise Database Applications", In Proceedings of 2008 ACM SIGMOD International Conference on Management of Data, Jun. 9, 2008, 12 Pages.
Wu, et al., "eNVy: A Non-Volatile, Main Memory Storage System", In Proceedings of the Sixth International Conference on Architectural support for Programming Languages and Operating Systems, Nov. 1, 1994, 12 Pages.
Xing, et al., "PeerDedupe: Insights into the Peer-assisted Sampling Deduplication", In Proceedings of IEEE Tenth International Conference on Peer-to-Peer Computing (P2P), Aug. 25, 2010, 10 Pages.
Yang, et al., "A Budget Travel Planning System using Ontologies for Web Information Aggregation", In proceedings of 2nd International Conference on Information & Communication Technologies (vol. 1), 2006, 6 Pages.
Zeinalipour-Yazti, et al., "MicroHash: An Efficient Index Structure for Flash-based Sensor Devices", In Proceedings of the Conference on File and Storage Technologies (FAST), vol. 5, Dec. 13, 2005, 14 Pages.
Zhu et al. "Avoiding the Disk Bottleneck in the Data Domain Deduplication File System", Proceedings of the 6th USENIX Conference on File and Storage Technologies, Feb. 26, 2008, 14 Pages.
Ziv, et al., "A Universal Algorithm for Sequential Data Compression", In Proceedings of the Transactions on Information Theory, vol. 23, Issue No. 3, May, 1977, 7 Pages.
Zukowski, et al. "Architecture-Conscious Hashing", Data Management on New Hardware, Proceedings of the 2nd International Workshop on Data Management on New Hardware, Jun. 25, 2006, 8 Pages.

* cited by examiner

ADDITION OF PLAN-GENERATION MODELS AND EXPERTISE BY CROWD CONTRIBUTORS

CROSS-REFERENCE TO RELATED APPLICATIONS

This application is a continuation of U.S. application Ser. No. 12/965,845, filed Dec. 11, 2010, entitled "Addition of Plan-Generation Models and Expertise by Crowd Contributors", the entirety which is hereby incorporated by reference herein.

BACKGROUND

Planning something like a vacation, conference or wedding is difficult, as there are enormous amounts of variables, options, goals and other factors that can be considered when making the plan. For example, a wedding may require a site for the ceremony, a site for the reception, bridesmaid's dresses, available hotel accommodations for out of town visitors, and so forth, which need to be considered in view of factors such as cost, timing, proximity and so forth.

A person planning something along these lines may search the Internet to help get ideas and to start narrowing down the possible choices. However, the amount of content returned for a search can be overwhelming, and many times much of it is irrelevant or impractical to use. Further, while a human can recognize a relationship between the diverse concepts related to a wedding, such as reception sites and bridesmaid's dresses, search engines generally do not. Thus, multiple searches typically need to be performed to find desired content.

However, the field of planning is very diverse. The types and demographics of people who want to plan things are widely variable. Further, the search content that appeals to one user may vary greatly from that of another, due to different purposes/moods/attitudes of people, e.g., two people may want to vacation near the same place in California, but one person may want to plan a golf vacation, while the other wants to tour wineries.

It would be extremely expensive, and almost infeasible, for a single company to create enough logic to help automatically generate (even in part) the widely diverse numbers and types of plans that people would desire. At the same time, experts, mavens and people who have experienced or put together well-planned events may have a great deal of planning expertise with respect to various parameters and circumstances, but (except for expensive professionals) have no way to share that expertise except to possibly assist friends in making similar plans. Adding content to the internet such as posting blogs, pictures and the like may help others to an extent, but this does not really help in the planning process beyond providing ideas, and suffers from the same drawbacks as mentioned above, e.g., getting buried amongst large amounts of diverse content.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology (e.g., provided by a web service) by which authors (including crowd contributors) use a suitable authoring tool to author new planning models, such as based upon an existing model or models. The models may be text-based so that authors can easily copy, modify and add to the text of one or more existing models in order to generate a new model. The models may be declarative so that any model content contributed by the crowd may be safely used by the service to generate a plan.

In usage (after authoring), each model contains rules, constraints and/or equations that when selected by a user, generate a plan comprising plan objects based on user-provided parameters. A presentation mechanism produces a presentation based upon the plan objects. An interaction mechanism allows the user to change the plan objects for producing a new presentation via the presentation mechanism. An interaction mechanism allows the user to change the user-provided parameters and thereby to generate a revised plan for the user, whereby the presentation mechanism generates a revised presentation based on the revised plan.

There is thus described the authoring of new models, including by maintaining a set of models, providing access to a selected model (or models) for authoring a new model, and maintaining the new model as a model of the set of models. Also described is usage of the new model in generating a plan.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards providing a way for crowd contributors (e.g., any interested internet users) to add their expertise with respect to event planning, such as to help authors author models used to generate plans appropriate for particular locations or circumstances. Moreover, the technology is directed towards helping end users who want to make a plan to discover this expertise and put it to use for their own plan.

In one implementation, there is provided a service that includes declarative models for generating plans. The models are configured as a set of rules, constraints and/or equations that help select content objects obtained from searches as plan objects, which may then be assembled into a plan. In one aspect, the models comprise text-based data, so that any user can edit one or more existing models into a new model, e.g., by copying and pasting, deleting, inserting and so forth.

It should be understood that any of the examples herein are non-limiting. For one, while the examples describe plans for vacations and other events, it is understood that anything that may be planned, such as a house remodel, may use the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computer assisted planning and modeling in general.

Figure 1:
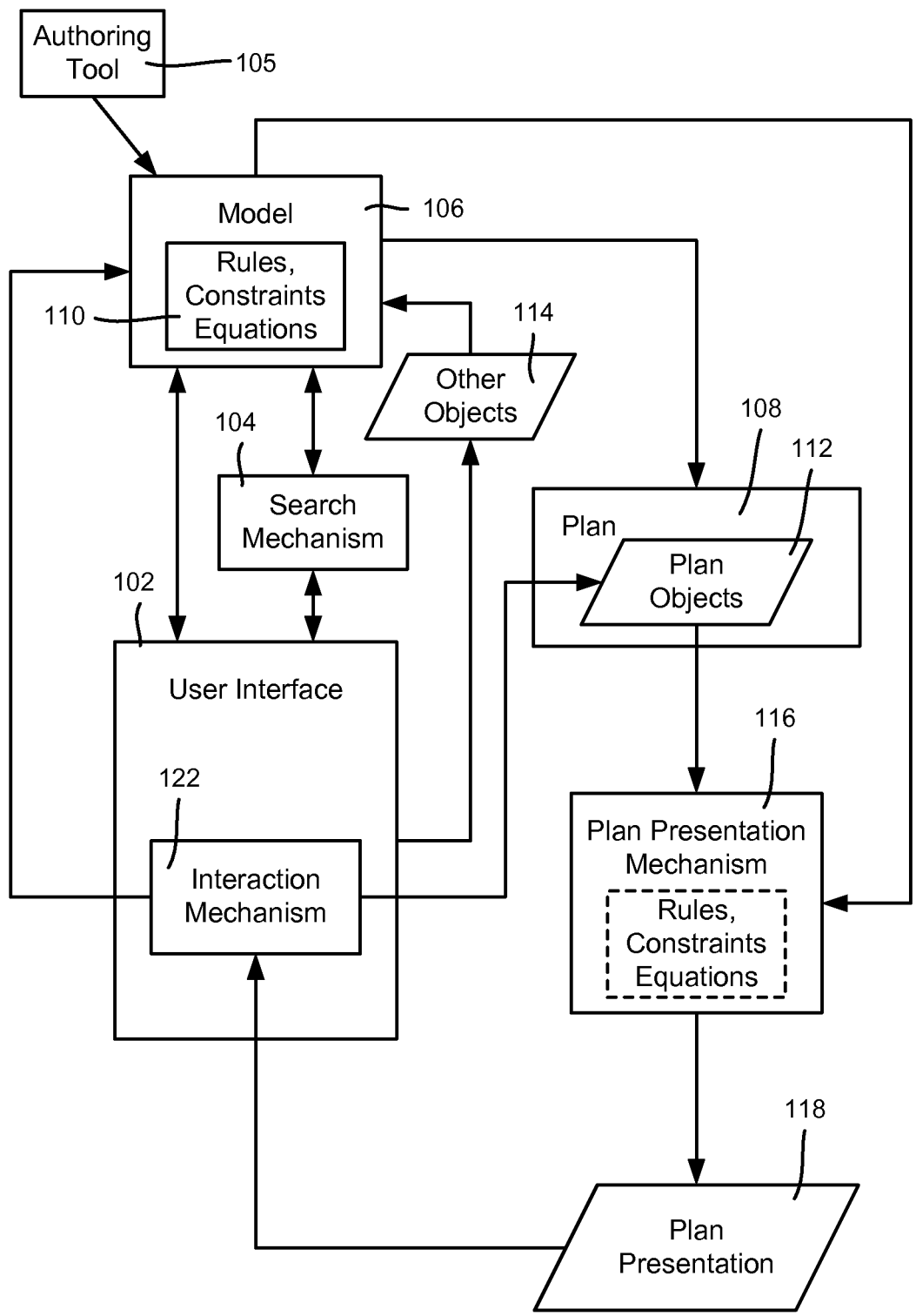
FIG. 1 is a block diagram representing example components for authoring a model that generates a plan and viewing a presentation of that plan.

FIG. 1 shows example components, such as implemented in a web service, directed towards plan model authoring and usage. In general, a user interested in planning an event or set of events interacts through a user interface 102 (which may leverage a search mechanism 104) to select a particular model 106. The model may be one that was authored via an authoring tool 105 as described below, and may be used as is to generate a plan, or as a basis for starting a plan.

In general, once a model 106 is selected, via the user interface 102 the user provides input (e.g., parameters) to the model 106 in order to generate a plan 108. As shown in FIG. 1, a single user interface 102 is shown, however it is understood that any component may have its own user interface capabilities, or may share a user interface with another component. Indeed, the components shown in FIG. 1 are only examples; any component exemplified in FIG. 1 may be combined with any other component or components, or further separated into subcomponents.

Each such model such as the model 106 includes rules, constraints and/or equations 110 for generating the relevant plan 108 to fit user input parameters and/or goals, as well as for generating other useful devices such as a schedule. For example, for a "Tuscany vacation" model, a rule may specify to select hotels based upon ratings, and a constraint may correspond to a total budget. An equation may be that the total vacation days equal the number of days in the Tuscany region plus the number of days spent elsewhere; e.g., if the user chooses a fourteen day vacation, and chooses to spend ten days in Tuscany, then four days remain for visiting other locations, (total days=Tuscany days+other days). Additional details about models and plans are described U.S. patent application Ser. No. 12/752,961, entitled "Adaptive Distribution of the Processing of Highly Interactive Applications," hereby incorporated by reference.

There may be many models from which a user may select, as described below. For example, one user may be contemplating a skiing vacation at a particular ski resort, whereby that user will select an appropriate model, while another user planning a beach wedding will select an entirely different model. Moreover, there may be multiple models for the same concept; for example, there may be several models for a Tuscany vacation, comprising a family model, a couples model, a first-class model, a low-budget model, a three-day model, and so on. Note that a single model may combine some of these concepts, and be controlled with input parameters that determine how the model generates a plan. For example, one model input parameter may be a "budget" input, whereby accommodations selected for the plan are selected based upon the budget amount. In other words, a single model may include both concepts of a first-class model and a low-budget model, with the model operating to select appropriate plan objects based on a user-input budget parameter, for example. In general, it is left up to a model author to determine how narrowly or broadly to focus a model's rules, constraints and/or equations, along with how to use input parameters to generate a desired plan for a user. Moreover, as described below, a user may modify a model or set of models into another model more suited for that particular user's plans.

The selected model 106 may generate separate searches for a concept. By way of the "beach wedding" example, the selected model 106 may be pre-configured to generate searches for beaches, water, oceanfront views, weddings, and so forth to obtain beach-related and wedding-related search content (objects). The model 106 may also generate searches for bridesmaid dresses, hotels, wedding ceremonies, wedding receptions, beach wedding ceremonies, beach wedding receptions and so forth to obtain additional relevant objects.

To develop the plan 108, the model 106 applies the rules, constraints and/or equations 110 to balance parameters and goals input by the user, such as budgets, locations, travel distances, types of accommodation, types of dining and entertainment facilities used, and so forth. The content that remains after the model 106 applies the rules, constraints and/or equations 110 comprise plan objects 112 that are used in presenting a plan to the user. Note that non-remaining search content need not be discarded, but rather may be cached, because as described below, the user may choose to change their parameters and goals, for example, or change the set of objects, resulting in a changed plan.

The search mechanism 104 includes technology (e.g., a search engine or access to a search engine) for searching the web and/or private resources for the desired content objects, which may include images, videos, audio, blog and tweet entries, reviews and ratings, location postings, and other signal captures related to the plan objects 112 contained within a generated plan 108. For example, objects in a generated plan related to a vacation may include places to go to, means of travel, places to stay, places to see, people to see, and actual dining and entertainment facilities. Any available information may be used in selecting and filtering content, e.g., GPS data associated with a photograph, tags (whether by a person or image recognition program), dates, times, ambient light, ambient noise, and so on. Language translation may be used, e.g., a model for "traditional Japanese wedding" may search for images tagged in the Japanese language so as to not be limited to only English language-tagged images. Language paraphrasing may be used, e.g., "Hawaiian beach wedding" may result in a search for "Hawaiian oceanfront hotels," and so forth.

Note that a user may interact with the search mechanism 104 to obtain other objects. A user may also provide such other objects 114 to the model 106 for consideration in generating a plan, such as the user's own photographs and videos, a favorite audio track, and so on, which the model may be configured to use when generating the plan objects 112.

The plan is then presented to the user in via a plan presentation mechanism 116, which processes the plan objects into suitable audio, visual and/or tactile output for consumption (and interaction therewith) by the user, as specified by the model (or possibly another source, such as a different model). One type of presentation in which the presentation mechanism 116 includes a content synthesizer corresponds to a synthesized linear narrative, as further described in the aforementioned U.S. patent application entitled "Synthesis of a Linear Narrative from Search Content." Other types of presentations, such as those described in the aforementioned U.S. patent application entitled "Immersive Planning of Events Including Vacations" include a timeline, calendar and/or schedule, corresponding to content of the objects in the plan, a presentation as a list, gallery, and/or on a map.

As represented in FIG. 1 via the interaction mechanism 120, the user may interact to make choices associated with any objects referred to in the presentation of the retrieved content. For example, a user may choose to delete a photograph that is not wanted. A user may delete a category, e.g., do not show bridesmaid dresses. A user also may specify other changes to the model parameters, e.g. whether the proposed hotel needs to be replaced with a cheaper hotel alternative. The user may interact with the model 106, plan objects 108 and/or other data (e.g., the other objects 114) to make choices that are global in nature, or choices that cross multiple objects in the display of the retrieved content, e.g. total number of days of a trip, or total budget.

Whenever the user makes such a change or set of changes, the model 106 may regenerate a new plan, and/or the plan presentation mechanism 116 may generate a new presentation. In this way, a user may perform re-planning based on any changes and/or further choices made by the user, and be presented with a new presentation. The user may compare the before and after plans upon re-planning, such as to see a side by side presentation of each. Various alternative plans may be saved for future reviewing, providing to others for their opinions, and so forth.

Figure 2:
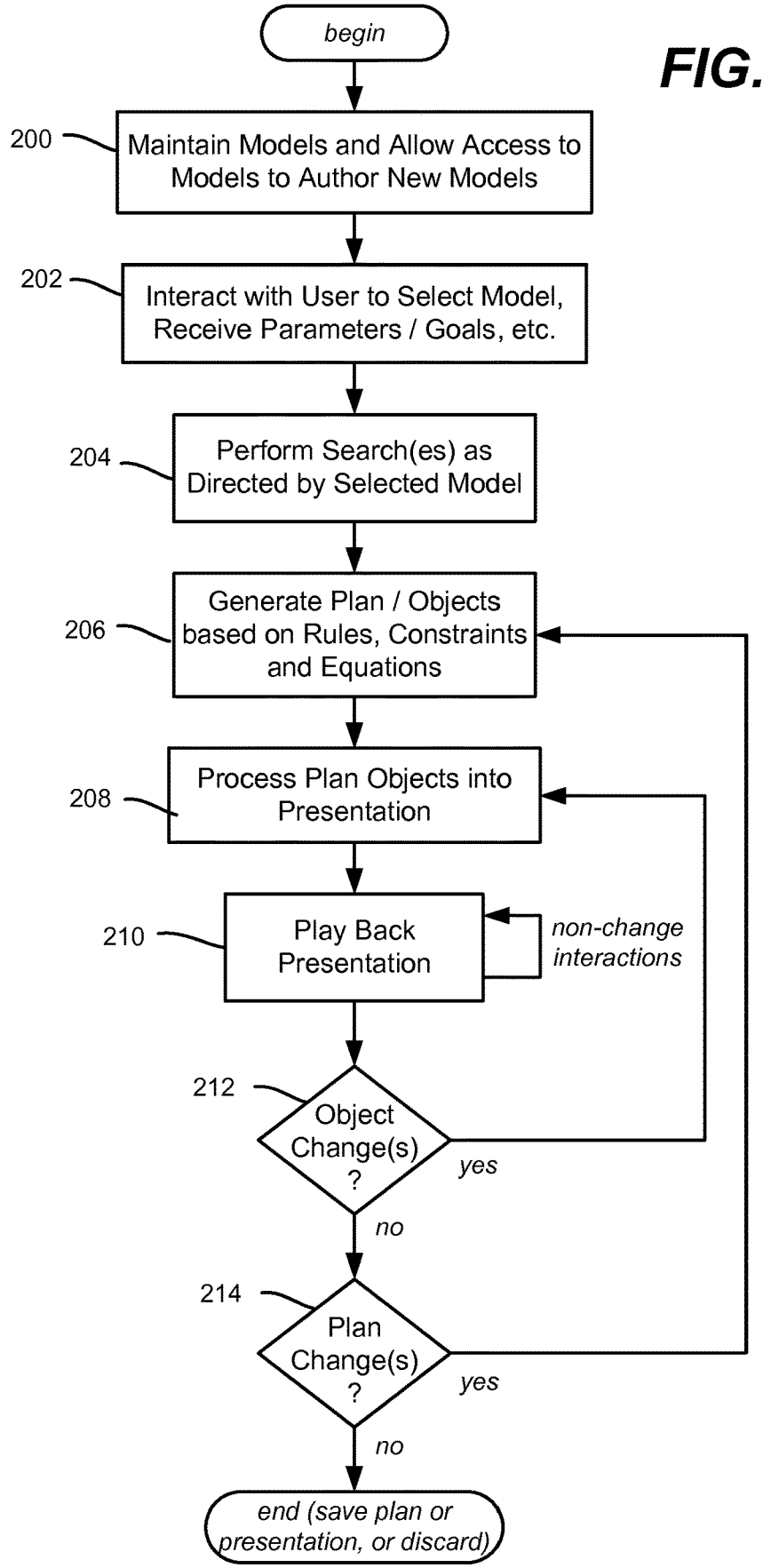
FIG. 2 is a flow diagram representing example steps related to maintaining and accessing models by authors and users.

FIG. 2 is an example flow diagram summarizing some of the concepts described above with respect to author and user interaction and component operations. Step 200 represents maintaining the various models or sets of models, and allowing authors (including crowd contributors) to access the models in order to develop new models therefrom. Note that the models may be maintained in virtually any way, possibly to facilitate efficient searching, by categories or relationships, and so forth.

Step 202 represents a service or the like interacting with a user to select a model and provide it with any relevant data. For example, a user may be presented with a wizard, selection boxes or the like that first determines what the user wants to do, e.g., plan an event, take a virtual tour, and so forth, eventually narrowing down by the user's answer or answers to match a model. For example, a user may select plan an event, then select from a set of possible events, e.g., plan a vacation, plan a wedding, plan a business meeting, and so forth. If the user selects plan a vacation, for example, the user may be asked when and where the vacation is to take place, a theme (skiing, golf, sightseeing, and so on), a budget limit and so forth.

By way of example, consider a user that interacts with a service or the like incorporated into Microsoft Corporation's Bing™ technology for the purpose of making a plan. One of the options with respect to the service may be to select a model, and then input parameters and other data into the selected model (e.g., a location and total budget). With this information, the search for the content may be performed (if not already performed in whole or in part, e.g., based upon the selected model), processed according to the rules, constraints and equations, and provided to the presentation mechanism 116. The presentation mechanism 116 generates the plan presentation 118 in a presentation form may that be specified by the model or user selection (play a narrative, show a timeline, and so on).

Thus, via step 202, a model may be selected for the user based on the information provided. Further, the user may be presented with a list of such models if more than one applies, e.g., "Low cost Tuscany vacation," "Five-star Tuscany vacation" and so forth.

Step 204 represents performing one or more searches as directed by the information associated with the model. For example, the above-described beach wedding model may be augmented with information that Hawaii is the desired location for the beach wedding, sunset the desired time, and search for hotels on Western shores of Hawaii, images of Hawaiian beaches taken near those hotels, videos of sunset weddings that took place in Hawaii, and so on. Alternatively, a broader search or set of searches may be performed and then filtered by the model based upon the more specific information.

Once the content is available, step 206 represents generating the plan according to the rules, constraints and equations. The result is a set of plan objects to be presented to the user.

Step 208 represents processing the plan objects into the presentation. Step 210 plays back the presentation under the control of the user. For example, the user may pause or rewind a narrative, advance in a timeline, zoom in on a map, and so on. The user may also switch and select among such different types of presentations if more than one is available via the model, e.g., move the timeline to December 2, and show an image of the hotel associated with that date superimposed over a map of the area in which the hotel is located.

As described above, as represented by step 212 the user may make changes to the objects, e.g., remove an image or video and/or category. The user may make one or more such changes. When the changes are submitted (e.g., the user selects "Re-plan with changes" or the like from a menu), step 212 returns to step 208 where a different set of plan objects may be re-synthesized into a new presentation, and presented to the user at step 210.

The user also may make changes to the plan, as represented via step 214. For example, a user may make a change to previously provided information, e.g., the event location may be changed, whereby a new plan is generated by the model by returning to step 208, and used to synthesize and present a new linear narrative (steps 208 and 210). Note that (although not shown this way in FIG. 2), a user may make both changes to objects and to the plan in the same interaction session, then have the plan regenerated based on both object and plan changes by returning to step 206.

The process continues until the user is done, at which time the user may save or discard the plan/presentation. Note that other options may be available to the user, e.g., an option to compare different presentations with one another, however such options are not shown in FIG. 2 for purposes of brevity.

Turning to various aspects related to authoring a model, the authoring tool 105 is provided to all third parties (e.g., a certain category of users of the hosted service, namely, "authors") to add models by providing an entirely new models or by modifying the data of one or more existing models into a new model. In general, the model is declarative in that it contains no code that executes on its own. As a result, anyone can author a model without being able to damage the service that runs it, regardless of what is in the model.

In one implementation, the models contain only text data, so that any user can edit one or more existing models into a new model, e.g., by copying and pasting, deleting, inserting and so forth. This allows new models to be authored by incremental augmenting over time based on their expertise.

Note that it is feasible to allow the model to contain non-textual content itself instead of a text reference to that content, e.g., a particular image; however, limiting the models to text-only allows the content of the models to be classified, indexed, searched and so on like any text-based content document, thereby allowing rapid retrieval of a relevant model or set of models when a user seeks one.

The authoring tool may be as simple as a text editor, or more sophisticated, such as to provide icons, visual assistance, pre-configured rules, constraints, equations and other functions or the like that the user may efficiently select and add to the model being authored. The authoring tool may include artificial intelligence or the like that helps authors. The authoring tool may be provided by a web service, or, for example, may be an author's own tool, e.g., the author may copy some or all of an existing model into his or her own workspace, edit the model into a new model, and then upload that new model to the set of models maintained by the service or other system with which users interact to generate a plan.

The authoring tool includes the ability to modify its user interface for displaying and navigating the retrieved content pictures, videos, audio, blog and tweet entries, reviews and ratings, location postings, and other signal captures in one of many ways, including in a linear narrative, timeline/calendar corresponding to the objects in the plan, or as a list or gallery, or on a map. Note that this may be accomplished by running the model's plan (even if only partially authored) through the existing plan presentation components described above with reference to FIGS. 1 and 2.

The authoring tool generally provides the ability to bind the rules/constraints/equations to data (made available by the hosted service, or from any other web service or data source) about the objects available to be included in a plan. In general, the authored-model's rules and constraints are published for execution by the hosted service. The publishing step may include the addition of implicit (name of creator, date of creation, contents of the rules/constraints/bound data) and explicit metadata (tags, purpose) that is usable for discovery of a particular publisher's rules/constraints.

Figure 3:
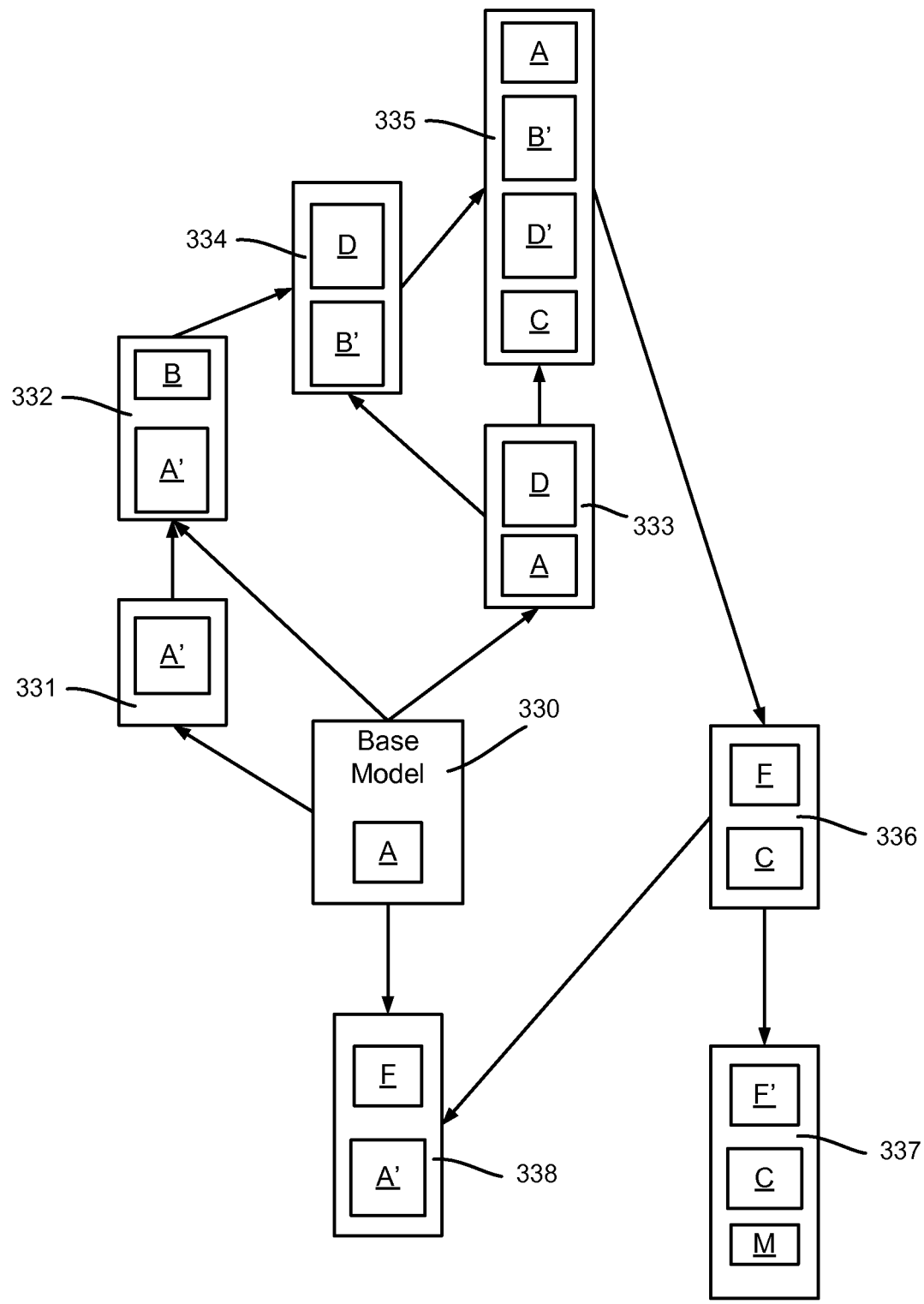
FIG. 3 is a representation of how models may be authored based upon existing models.

FIG. 3 shows how a set of models 331-338 may be authored to evolve from a base model 330 containing some authored text A in the form of rules, constraints and/or equations. For example, such a base model 330 may be authored by employees or contractors of the hosted service to give participating authors (crowd contributors) some models to work with as a head start in augmenting, refining and otherwise improving models. There is nothing preventing an author from creating an entirely new model, however. Note that FIG. 3 shows a simplified example in which only a relatively small numbers of new models are authored based upon an existing model, however it is anticipated that some types of models such as a vacation model may evolve into many thousands or even millions of such vacation models.

In the simplified example of FIG. 3, a new model 331 is formed by changing some of the text A into modified text A'; (each line between models represents usage of an authoring tool such as the authoring tool 105, e.g., provided by the service). A new model 332 is authored based upon the text A' being augmented with new text B; similarly a new model 332 is authored based on the original text A being augmented with new text D, placed before new text A in this example (in the event that the ordering matters). Note that there is no defined delineation between when some text is modified via a minor addition versus new text being added; however the concept of a modification also includes the concept of deletion and/or replacement.

The models 332 and 333 can have parts of their respective text B and D combined into a new model 334, which may include text D and modified text B' thereafter. Note that the model 334 may contain none of the original text A, yet still evolved from the base model 330 that contained only text A. This model may be used as the basis for a new model 335 that again contains the original content A. As can be following using the above-described nomenclature, more and more models (e.g., the models 336-338) may be authored in a similar manner.

Note that interaction and other feedback may be used to generate a new model for a user. For example, consider that a user requests that an object such as a musical audio track be removed, because that user thinks that the particular song is annoying. Instead of simply removing the object and regenerating the presentation, the model itself may be automatically changed into a new model by including or modifying a rule or constraint in the old model so as to not select that object as a plan object. Note that authoring a new model for such a simple change this may not be practical or desirable for each individual user; however if the service keeps statistics or other data on changes and feedback made by many users, it may become apparent that a new model that does not include this musical audio track will be even more popular, and such a new model may be automatically (or even manually) authored.

As can be readily appreciated, various ways to help a user select a model from among the possibly vast number of them are feasible. In addition to searching the internal metadata and/or content as described above, popularity, usage, user ratings, title (e.g., Whistler ski trip), feedback and so on may be used to help a user locate an appropriate model. A user of the service may subscribe to automatically find out daily, weekly or so on when new models are available, such as models related to a particular category (vacations), subcategory (vacations related to Europe) and so on.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 4:
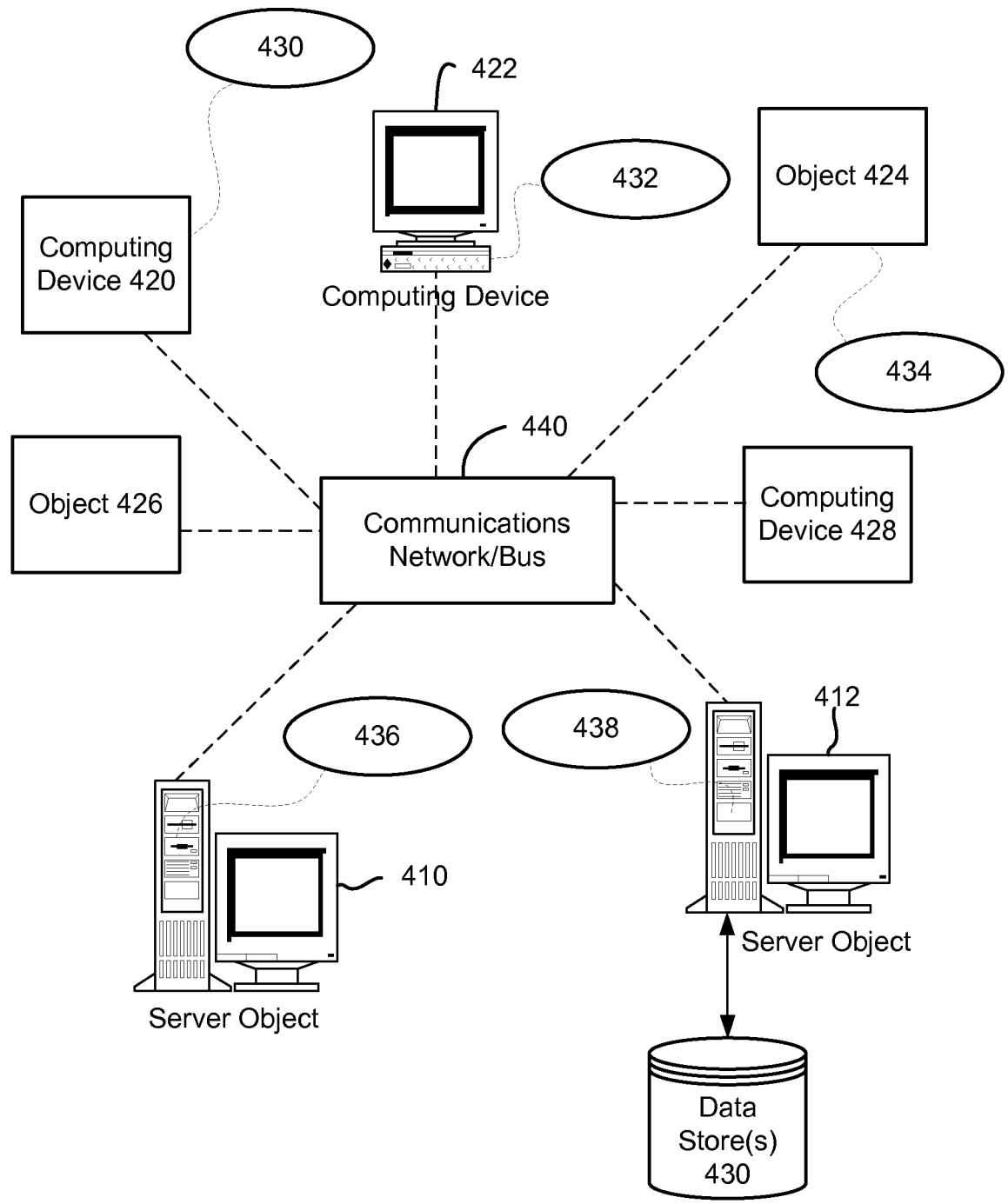
FIG. 4 is a block diagram representing exemplary non-limiting networked environments in which various embodiments described herein can be implemented.

FIG. 4 provides a schematic diagram of an exemplary networked or distributed computing environment. The distributed computing environment comprises computing objects 410, 412, etc., and computing objects or devices 420, 422, 424, 426, 428, etc., which may include programs, methods, data stores, programmable logic, etc. as represented by example applications 430, 432, 434, 436, 438. It can be appreciated that computing objects 410, 412, etc. and computing objects or devices 420, 422, 424, 426, 428, etc. may comprise different devices, such as personal digital assistants (PDAs), audio/video devices, mobile phones, MP3 players, personal computers, laptops, etc.

Each computing object 410, 412, etc. and computing objects or devices 420, 422, 424, 426, 428, etc. can communicate with one or more other computing objects 410, 412, etc. and computing objects or devices 420, 422, 424, 426, 428, etc. by way of the communications network 440, either directly or indirectly. Even though illustrated as a single element in FIG. 4, communications network 440 may comprise other computing objects and computing devices that provide services to the system of FIG. 4, and/or may represent multiple interconnected networks, which are not shown. Each computing object 410, 412, etc. or computing object or device 420, 422, 424, 426, 428, etc. can also contain an application, such as applications 430, 432, 434, 436, 438, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 4, as a non-limiting example, computing objects or devices 420, 422, 424, 426, 428, etc. can be thought of as clients and computing objects 410, 412, etc. can be thought of as servers where computing objects 410, 412, etc., acting as servers provide data services, such as receiving data from client computing objects or devices 420, 422, 424, 426, 428, etc., storing of data, processing of data, transmitting data to client computing objects or devices 420, 422, 424, 426, 428, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 440 or bus is the Internet, for example, the computing objects 410, 412, etc. can be Web servers with which other computing objects or devices 420, 422, 424, 426, 428, etc. communicate via any of a number of known protocols, such as the hypertext transfer protocol (HTTP). Computing objects 410, 412, etc. acting as servers may also serve as clients, e.g., computing objects or devices 420, 422, 424, 426, 428, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 5 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 5:
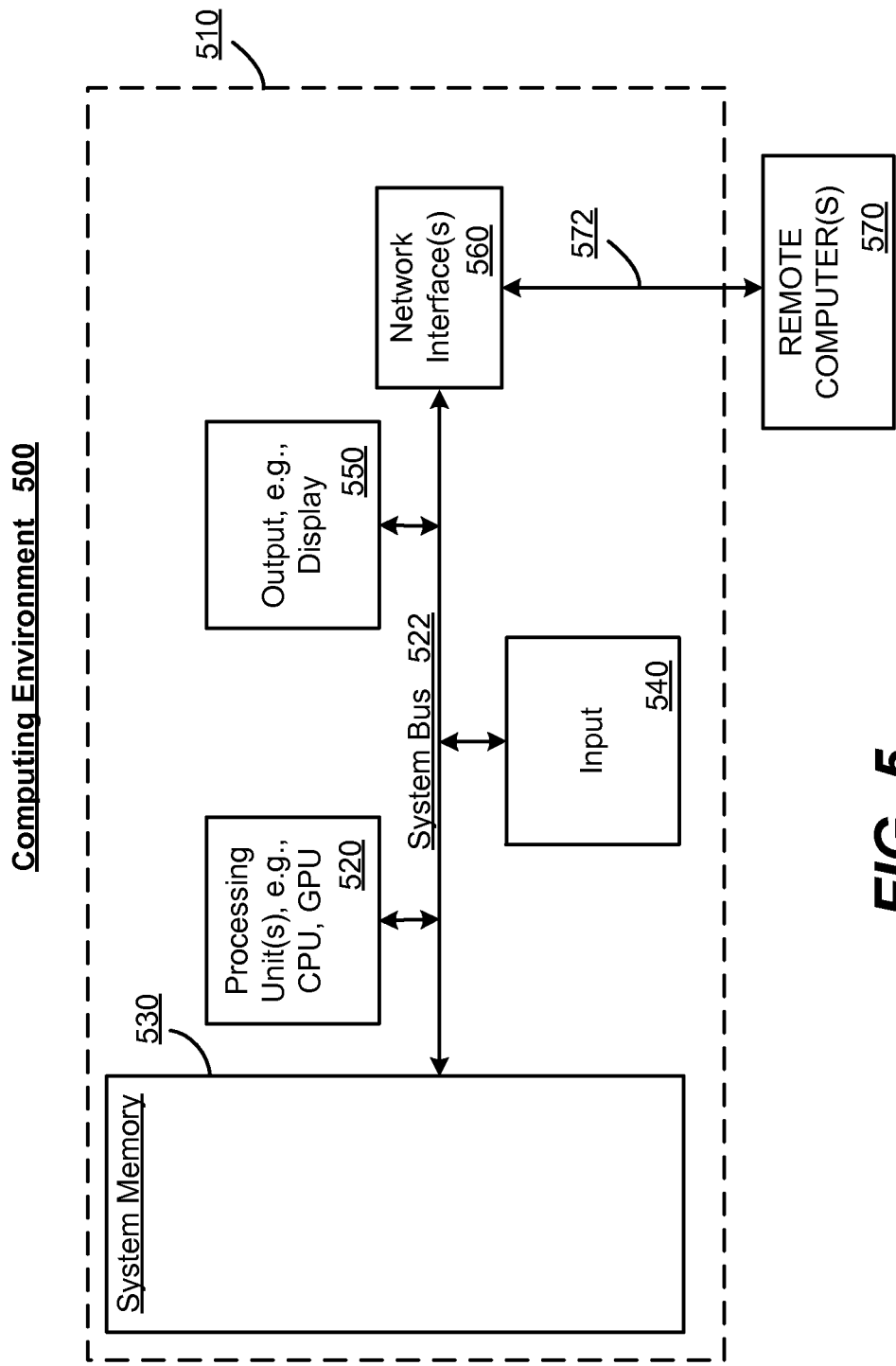
FIG. 5 is a block diagram representing an exemplary non-limiting computing system or operating environment in which one or more aspects of various embodiments described herein can be implemented.

FIG. 5 thus illustrates an example of a suitable computing system environment 500 in which one or aspects of the embodiments described herein can be implemented, although as made clear above, the computing system environment 500 is only one example of a suitable computing environment and is not intended to suggest any limitation as to scope of use or functionality. In addition, the computing system environment 500 is not intended to be interpreted as having any dependency relating to any one or combination of components illustrated in the exemplary computing system environment 500.

With reference to FIG. 5, an exemplary remote device for implementing one or more embodiments includes a general purpose computing device in the form of a computer 510. Components of computer 510 may include, but are not limited to, a processing unit 520, a system memory 530, and a system bus 522 that couples various system components including the system memory to the processing unit 520.

Computer 510 typically includes a variety of computer readable media and can be any available media that can be accessed by computer 510. The system memory 530 may include computer storage media in the form of volatile and/or nonvolatile memory such as read only memory (ROM) and/or random access memory (RAM). By way of example, and not limitation, system memory 530 may also include an operating system, application programs, other program modules, and program data.

A user can enter commands and information into the computer 510 through input devices 540. A monitor or other type of display device is also connected to the system bus 522 via an interface, such as output interface 550. In addition to a monitor, computers can also include other peripheral output devices such as speakers and a printer, which may be connected through output interface 550.

The computer 510 may operate in a networked or distributed environment using logical connections to one or more other remote computers, such as remote computer 570. The remote computer 570 may be a personal computer, a server, a router, a network PC, a peer device or other common network node, or any other remote media consumption or transmission device, and may include any or all of the elements described above relative to the computer 510. The logical connections depicted in FIG. 5 include a network 572, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:
1. In a computing environment, a system, comprising:
a memory; and
one or more processors programmed to:
  enable an author from among crowd contributors to author a model comprising one or more of the following: rules, constraints, and equations;

generate a plan comprising plan objects based on one or more of the following: the rules, the constraints, and the equations;

provide a presentation of the plan to a first user;

receive user input from the first user with respect to one or more of the plan objects during the presentation of the plan;

generate a new model based on the user input from the first user;

receive input from a second user;

based on the received input from the second user, select the new model from a plurality of models;

generate a second plan from the new model based upon the new model and the received input from the second user with respect to changes to one or more of the following: the plan objects, the rules, the constraints, and the equations; and provide a presentation of the second plan to the second user.

2. The system of claim 1 wherein generating the second plan from the new model based upon the new model and input from a second user with respect to changes to two or more of the following: the plan objects, the rules, the constraints, and the equations.

3. The system of claim 1 wherein generating the second plan from the new model based upon the new model and input from a second user with respect to changes to the following: the plan objects, the rules, the constraints, and the equations.

4. The system of claim 1 wherein the new model is based upon an existing model, and wherein the existing model and new model contain only text data.

5. The system of claim 1 wherein the new model is based upon an existing model, and wherein the existing model and new model are declarative.

6. The system of claim 1 wherein the new model is based upon an existing model, and wherein the one or more processors are further programmed to allow authoring of the new model based upon the existing model by modifying text from the existing model, or adding to text from the existing model, or by both modifying text from the existing model and adding to text from the existing model.

7. The system of claim 1 wherein the new model is based upon an existing model, and wherein the one or more processors are further programmed to allow authoring of the new model based upon the existing model by combining text from the existing model with text from another existing model.

8. The system of claim 1 wherein the new model is coupled to a search mechanism that provides content objects, and wherein the new model uses the rules, constraints or equations, or any combination of the rules, constraints or equations to generate the plan comprising plan objects.

9. The system of claim 1 wherein the new model is selected by a user and used with user input data to generate a plan for the user that includes plan objects selected based at least in part upon the user input data, and further comprising, a user interface by which a user experiences the presentation produced by the presentation mechanism.

10. The system of claim 9 further comprising, an interaction mechanism configured to allow one or more changes to the plan objects, the presentation mechanism configured to generate a new presentation based on the changes to the plan objects.

11. The system of claim 1 wherein the new model is selected by a user and used with user input data to generate a plan for the user, and further comprising, an interaction mechanism configured to allow one or more changes to the input data by which the model generates a new plan comprising a different set of plan objects, the presentation mechanism configured to generate a new presentation based on the different set of plan objects.

12. The system of claim 1 wherein the plan objects are processed into a linear narrative.

13. The system of claim 1 wherein the presentation includes a timeline, a calendar, a schedule, a presentation, a list, a gallery, or a map, or any combination of the timeline, the calendar, the schedule, the presentation, the list, the gallery, or the map.

14. In a computing environment, a method performed at least in part on at least one processor, comprising:

enabling an author from among crowd contributors to author a model comprising one or more of the following: rules, constraints, and equations;

generating a plan comprising plan objects based on one or more of the following: the rules, the constraints, and the equations;

providing a presentation of the plan to a first user;

receiving user input from the first user with respect to one or more of the plan objects during the presentation of the plan;

generating a new model based on the user input from the first user;

receiving input from a second user;

based on the received input from the second user, selecting the new model from a plurality of models;

generating a second plan from the new model based upon the new model and the received input from the second user with respect to changes to one or more of the following: the plan objects, the rules, the constraints, and the equations; and providing a presentation of the second plan to the second user.

15. The method of claim 14 wherein the new model is based upon an existing model, and wherein the existing model and new model contain only text data.

16. The method of claim 14 further comprising, locating a selected model from a set of models based upon author or user input data.

17. The method of claim 14 further comprising, authoring another new model from the new model, including allowing content of the new model to be used for editing into other new model, or combined with content from one or more other models into the other new model, or both used for editing into the other new model, or combined with content from one or more other models into the other new model.

18. The method of claim 14 wherein the presentation includes a timeline, a calendar, a schedule, a presentation, a list, a gallery, or a map, or any combination of the timeline, the calendar, the schedule, the presentation, the list, the gallery, or the map.

19. One or more computer-readable storage media having computer-executable instructions, which when executed perform steps, comprising, enabling an author from among crowd contributors to author a model comprising one or more of the following: rules, constraints, and equations;

generating a plan comprising plan objects based on one or more of the following: the rules, the constraints, and the equations;

providing a presentation of the plan to a first user;
receiving user input from the first user with respect to one or more of the plan objects during the presentation of the plan;
generating a new model based on the user input from the first user;
receiving input from a second user;
based on the received input from the second user, selecting the new model from a plurality of models;
generating a second plan from the new model based upon the new model and the received input from the second user with respect to changes to one or more of the following: the plan objects, the rules, the constraints, and the equations; and
providing a presentation of the second plan to the second user.

20. The one or more computer-readable storage media of claim 19 having further computer-executable instructions comprising, receiving a new model from an author via a web service, and adding that new model to the set of models.

\* \* \* \* \*